United States Patent

[11] 3,581,852

| | | | |
|---|---|---|---|
| [72] | Inventor | Thomas J. Griffen Dearborn, Mich. | |
| [21] | Appl. No. | 867,180 | |
| [22] | Filed | Oct. 17, 1969 | |
| [45] | Patented | June 1, 1971 | |
| [73] | Assignee | General Motors Corporation Detroit, Mich. | |

[54] ENGINE AND PARKING BRAKE CONTROLLED BY TRANSMISSION RATIO AND ENGINE TEMPERATURE
2 Claims, 1 Drawing Fig.

[52] U.S. Cl. .................................................. 192/4,
192/3, 74/846, 74/873, 123/103, 123/117, 137/625.69
[51] Int. Cl. .................................................. F16h 57/10
[50] Field of Search .......................................... 74/873,
872, 860, 874, 857; 192/4 A; 74/846

[56] References Cited
UNITED STATES PATENTS

| | | | |
|---|---|---|---|
| 2,762,235 | 9/1956 | Olson et al. .................. | 74/873 |
| 2,915,914 | 12/1959 | Burnell et al. ................ | 74/873 |
| 3,483,853 | 12/1969 | Fricker ........................ | 74/873X |
| 3,255,852 | 6/1966 | Martin et al. ................. | 192/4A |

Primary Examiner—Benjamin W. Wyche
Attorneys—W. E. Finken, A. M. Heiter and D. F. Scherer ABSTRACT: A vacuum control system having hydraulic- and temperature-actuated control valves. The control valves direct vacuum signals from the engine inlet manifold to the ignition distributor, the idle speed control and the vehicle-parking brake under specific conditions. The control valves are operated automatically such that when the vehicle transmission is in high gear normal ignition spark advance will occur, when the transmission is conditioned for other than high gear and the engine temperature is above a predetermined value normal ignition spark advance will occur, when the transmission is shifted from neutral or park to forward or reverse drive the parking brake will be released, and when the transmission is in neutral or park and the engine temperature is above the predetermined temperature, the engine idle speed will be increased.

PATENTED JUN 1 1971
3,581,852
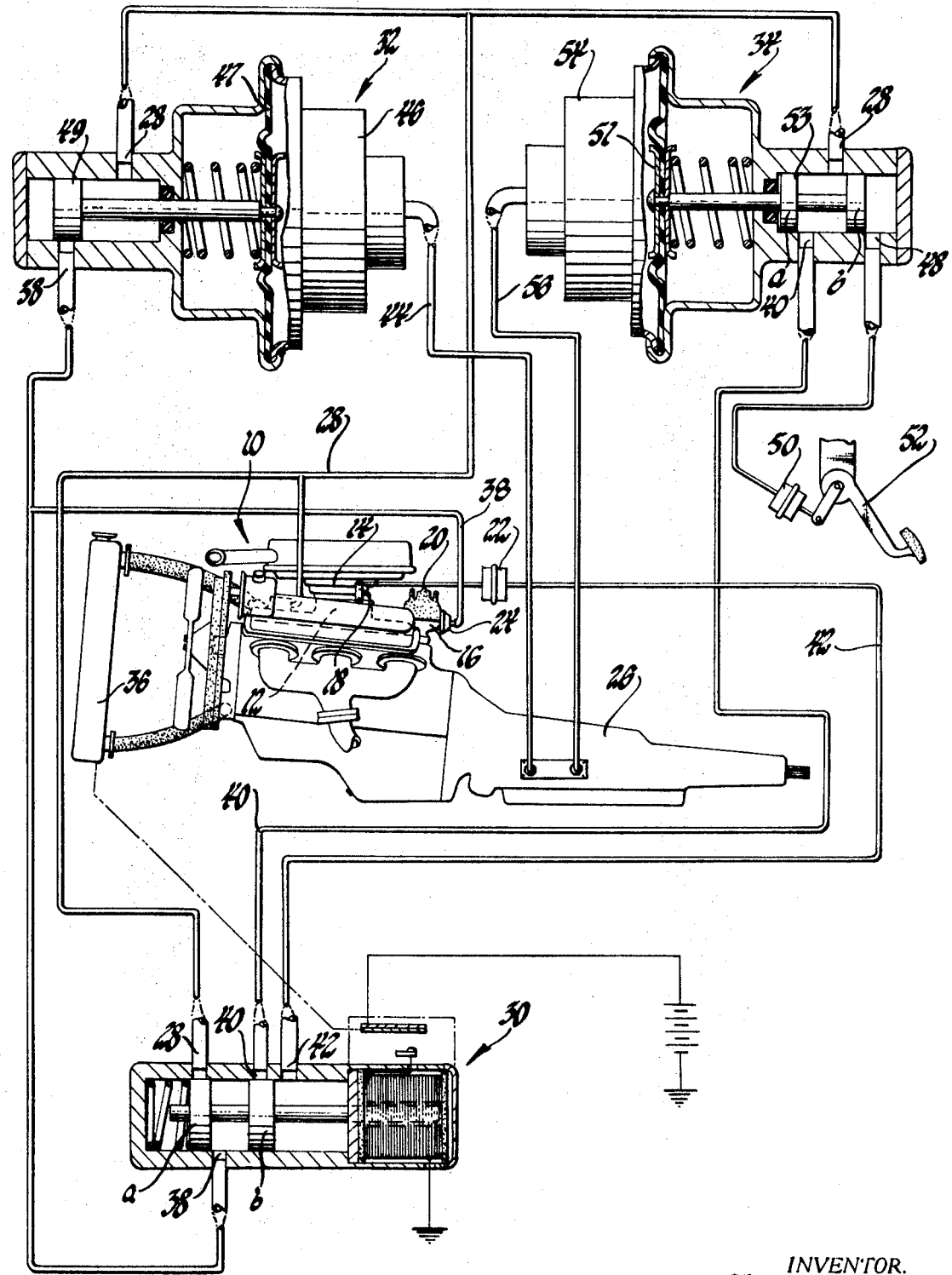
INVENTOR.
Thomas J Griffen
BY
Donald F. Scherer
ATTORNEY

ENGINE AND PARKING BRAKE CONTROLLED BY TRANSMISSION RATIO AND ENGINE TEMPERATURE

This invention relates to vacuum control systems and more particularly to vacuum control systems for controlling engine spark advance and idle speed, and vehicle-parking brake release.

When operating the vehicle in the high drive ratio, it is desirable to permit normal ignition advance at all times to provide maximum vehicle performance. At low engine and vehicle speeds, when the transmission is in low or intermediate drive, it is desirable to retard the ignition timing to reduce exhaust emissions. However, if the engine should begin to overheat, it is then desirable to provide normal spark advance so that the engine life will not be reduced.

When operating the vehicle in the neutral or park condition, it is desirable to increase the engine idle speed to reduce the possibility of engine overheating when a predetermined engine temperature has been reached.

Another important consideration in the operation of a motor vehicle is to insure the release of the parking brake when a forward or reverse drive is initiated in the transmission. If the brake is not released, unnecessary brake wear can occur thereby reducing the life of the service brakes.

It is therefore an object of this invention to provide a vacuum control system responsive to temperature and hydraulic signals to permit idle speed increase in neutral or park above a predetermined temperature, to permit normal ignition advance in high drive ratio at all times and to permit normal ignition advance in lower drive ratios above a predetermined engine operating temperature.

Another object of this invention is to provide a vacuum control system responsive to temperature and hydraulic signals to permit idle speed increase in neutral or park above a predetermined temperature, to permit normal ignition advance in high drive ratio at all times and in lower drive ratio above a predetermined engine-operating temperature, and to automatically release the vehicle-parking brake when a forward or reverse drive is engaged.

These and other objects and advantages will be more apparent to those skilled in the art from the following description and drawing which is a diagrammatic representation of the control system.

Referring to the drawings, there is shown an internal combustion engine 10 having an inlet manifold 12, a carburetor 14 affixed to the inlet manifold and an ignition distributor 16. The carburetor 14 has an idle control 18 which is connected through a rod or linkage 20 to a vacuum motor 22. The ignition distributor 16 has a vacuum motor 24 associated therewith which functions in a conventional known manner to advance or retard the ignition timing in response to manifold vacuum. The distributor 16 and motor 24 are of the type shown in the U.S. Pat. Hartzell et al. No. 2,872,537. An automatic transmission 26 is secured to the engine and is driven thereby. The automatic transmission is a conventional three speed torque converter and planetary gearing transmission which is adapted to drive the rear wheels of the vehicle, not shown.

The inlet manifold 12 has a passage 28 connected thereto which passage 28 is also connected to a temperature actuated vacuum valve 30 and a pair of hydraulically actuated vacuum valves 32 and 34 to direct subatmospheric pressure or vacuum thereto. The temperature actuated vacuum valve 30 is operatively secured to the vehicle radiator 36 to effectively measure water temperature of the engine 10. The vacuum valve 30 has three other passages 38, 40, and 42. The passage 38 is connected to the vacuum motor 24 on the distributor 16 and to the vacuum valve 32. The passage 40 is connected to the vacuum valve 34 and the passage 42 is connected to the vacumm motor 22. The valve 30 is a conventional four-way valve which is normally closed in its unactuated position. That is, passages 28 and 40 are closed by valve lands a and b to the passages 38 and 42 respectively when the valve is not actuated. When, however, the temperature of the cooling fluid in the radiator 36 increases above a predetermined value, for example, 200° F., the temperature-actuated vacuum valve 30 will open permitting communication between passages 28 and 38 and passages 40 and 42.

The vacuum valve 32 is a hydraulically actuated valve and is connected by passage 44 to the transmission 26. The passage 44 is still connected to the transmission hydraulic system such that when the vehicle is operating in high ratio drive, the passage 44 will be pressurized. The valve 32 is a two-way control valve having a hydraulically actuated motor 46 including a diaphragm 47 which moves a valve spool 49 in response to the hydraulic signal in passage 44 to connect passages 28 and 38. In the normal condition, the passage 28 is closed to the passage 38 such that no vacuum signal is transferred through the valve. However, when the passage 44 is pressurized, the valve 32 will open permitting communication between passages 28 and 38.

The vacuum valve 34 is also a hydraulically actuated vacuum valve, this valve 34 has a normally open condition between passage 28 and 40 and a normally closed condition between passage 28 and a passage 48 which is connected to a vacuum motor 50 operatively connected to vehicle-parking brake actuator 52. The actuator 52 is adapted to engage the rear vehicle brakes when it is desired to hold the vehicle in a parked position. The valve 34 has a hydraulic motor 54 having a diaphragm 51 that actuates a valves spool 53. The motor 54 is connected by a passage 56 to the transmission hydraulic control system such that passage 56 is pressurized whenever the transmission is conditioned for the forward or reverse drive. When the passage 56 is pressurized, the passage 28 is in fluid communication through the valve 34 between lands a and b with the passage 48 thereby connecting vacuum with the motor 50 to disengage the parking brake 52. When the passage 56 is not pressurized, the passage 28 is in fluid communication through the valve 34 between lands a and b with the passage 40. During operation with the engine running and the transmission in a neutral or park position, the valves 32 and 34 will be in their normal position so that passage 28 will be closed to passages 38 and 48 and will be open to passage 40. Assuming the engine temperature is in the normal operating range, the valve 30 will be in its normally closed position so that passage 28 will be closed to passage 38 and passage 40 will be closed to passage 42. If the engine should tend to overheat in this condition, the valve 30 will open permitting communication from passage 28 through passage 38 to the vacuum motor 24 which will advance ignition timing and the passage 40 will be open through passage 42 to the vacuum motor 22 to increase the engine idle speed. These two conditions, that is, increase in engine idle speed and advance in ignition timing, will reduce the engine overheating tendency.

If the transmission is shifted to the forward or reverse drive, the passage 56 will be pressurized thereby actuating the vacuum valve 34, to disconnect the passage 28 from passage 40 while connecting passage 28 to passage 48. In this condition, the vacuum will be directed through passage 48 to the vacuum motor 50 to automatically release the vehicle parking brake 52, if the brake had been set previously by the operator. Again assuming the engine cooling temperature is in the normal operating range, and the vehicle is being driven in the low or intermediate forward drive range, the passage 28 will be closed to the passage 38 so that normal ignition timing advance will not occur. Again, however, if the engine should tend to overheat, particularly at low vehicle speeds, the temperature actuated vacuum valve 30 will open permitting communication from passage 28 through passage 38 to the vacuum motor 24 to permit spark advance or ignition timing advance to reduce engine heating. The passage 40 will also be open to the passage 42. However, the passage 40 will not be open to the passage 28 to the valve 34 so that the carburetor idle control 18 will not be affected. When the transmission automatically upshifts to the high drive ratio, the passage 44 will be energized or pressurized thus actuating the vacuum valve 32 to provide communication between passage 28 and 38. Thus the ignition timing will be advanced when the vacuum is connected through passage 38 to the distributor 16. This permits optimum vehicle performance in the high drive range irregardless of engine operating temperature.

Obviously many modifications and variations will occur to those skilled in the art. Therefore, the above description and drawing is only intended to illustrate the preferred embodiment of the invention and is not intended as a limitation thereof.

What I claim is:

1. A temperature and hydraulically actuated vacuum control system for use with a water-cooled internal combustion engine having an inlet manifold, an idle control, a distributor, and a cooling radiator, and driving a hydrodynamic transmission having high and low forward drives, a reverse drive, a neutral condition and a park condition, said control system including a temperature-actuated vacuum valve operatively connected to the radiator and operable to open above a predetermined temperature; a first hydraulically actuated vacuum valve; a second hydraulically actuated vacuum valve; first vacuum passage means for connecting the inlet manifold with said vacuum valves; second vacuum passage means connecting the distributor with said temperature-actuated vacuum valve and said first hydraulically actuated vacuum valve; third vacuum passage means connecting said second hydraulically actuated vacuum valve with said temperature-actuated vacuum valve; fourth vacuum passage means connecting said temperature-actuated vacuum valve with the idle control; first hydraulic passage means connecting the transmission with said first hydraulically actuated vacuum valve for providing a hydraulic signal thereto when the transmission is in the high forward drive; and second hydraulic passage means connecting the transmission with said second hydraulically actuated vacuum valve for providing a hydraulic signal thereto when said transmission is in the forward or reverse drive; whereby when said transmission is in high forward drive the distributor will receive a vacuum ignition advance signal, when said transmission is in the low forward drive and the temperature-actuated vacuum valve is open, the distributor will receive a vacuum ignition advance signal, and when the transmission is in neutral or park and the temperature-actuated vacuum valve is open, the idle control will receive an idle increase vacuum signal.

2. A temperature and hydraulically actuated vacuum control system for use with a vehicle having a parking brake and a water-cooled internal combustion engine having a inlet manifold, an idle control, a distributor, and a cooling radiator, and driving a hydrodynamic transmission having high, intermediate, and low forward drives, a reverse drive, a neutral condition and a park condition, said control system including temperature-actuated vacuum valve means operatively connected to the radiator having two normally closed ports and being operable to open above a predetermined temperature; first hydraulically actuated vacuum valve means having a normally closed port and being operable in response to a hydraulic signal to open; second hydraulically actuated vacuum valve means having a normally open port and a normally closed port and being operable to close the open port and open the closed port in response to a hydraulic signal; first vacuum passage means for connecting the inlet manifold with all of said vacuum valves; second vacuum passage means connecting the distributor with said temperature-actuated vacuum valve and said first hydraulically actuated vacuum valve; third vacuum passage means connecting said second hydraulically actuated vacuum valve with said temperature-actuated vacuum valve; fourth vacuum passage means connecting said temperature-actuated vacuum valve with the idle control; fifth vacuum passage means connecting said second hydraulically actuated vacuum valve with the parking brake; first hydraulic passage means connecting the transmission with said first hydraulically actuated vacuum valve for providing a hydraulic signal thereto when the transmission is in the high forward drive to open the vacuum to permit a vacuum ignition advance signal to be distributed to the distributor; and second hydraulic passage means connecting the transmission with said second hydraulically actuated vacuum valve for providing a hydraulic signal thereto when said transmission is in the forward or reverse drive to open the normally closed port thereof to permit a vacuum signal to be directed to the parking brake for release thereof; whereby when said transmission is in high forward drive the distributor will receive a vacuum ignition advance signal, when said transmission is in the low and intermediate forward drive and the temperature-actuated vacuum valve is open, the distributor will receive a vacuum ignition advance signal, and when the transmission is in neutral or park and the temperature-actuated vacuum valve is open, the idle control will receive an idle increase vacuum signal and the distributor will receive a vacuum ignition advance signal.